United States Patent [19]
Miyano et al.

[11] Patent Number: 6,131,467
[45] Date of Patent: *Oct. 17, 2000

[54] PRESSURE SENSOR INCLUDING A JOINT FOR CONNECTING A HOUSING AND CONNECTOR CASE TOGETHER

[75] Inventors: Junichi Miyano; Akira Sawada; Keiji Sasaki, all of Tokyo, Japan

[73] Assignee: Fujikoki Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/074,592

[22] Filed: May 8, 1998

[30] Foreign Application Priority Data

| | | | |
|---|---|---|---|
| May 9, 1997 | [JP] | Japan | 9-119097 |
| Jun. 23, 1997 | [JP] | Japan | 9-165728 |
| Jul. 10, 1997 | [JP] | Japan | 9-185141 |

[51] Int. Cl.$^7$ ........................................................ G01L 7/00
[52] U.S. Cl. .............................................................. 73/756
[58] Field of Search ............................. 73/720, 721, 718, 73/724, 726, 727, 756; 338/4, 42

[56] References Cited

U.S. PATENT DOCUMENTS 5,051,937  9/1991  Kawate et al. ............................. 73/718
5,317,921  6/1994  Kremidas ................................... 73/721

*Primary Examiner*—William Oen
*Attorney, Agent, or Firm*—Armstrong, Westerman, Hattori, McLeland & Naughton

[57] ABSTRACT

The present pressure sensor is formed to enable an easy assembly of the sensor body, the sensor element, the substrate, the lead, the shield plate, the terminal holder, the terminal, the water-proof o-ring, the connector case, and further enabling an easy change in design of the connector case. In a pressure sensor comprising a housing 1 and a connector case 9, and having in the interior thereof a sensor element 2, a substrate 3, a lead 4, a shield plate 5, a terminal holder 71, a terminal 72, water-proof o-rings 8a and 8b, a joint 6 is equipped having a staking portion against the housing 1 and the connector case 9 on its upper portion and its lower portion. This could be formed as a joint having a shield portion formed as one unit.

14 Claims, 14 Drawing Sheets

Fig. 1A
Fig. 1B
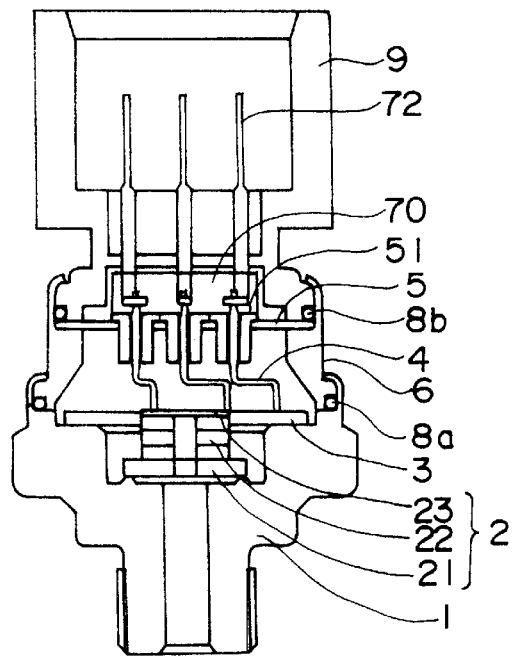
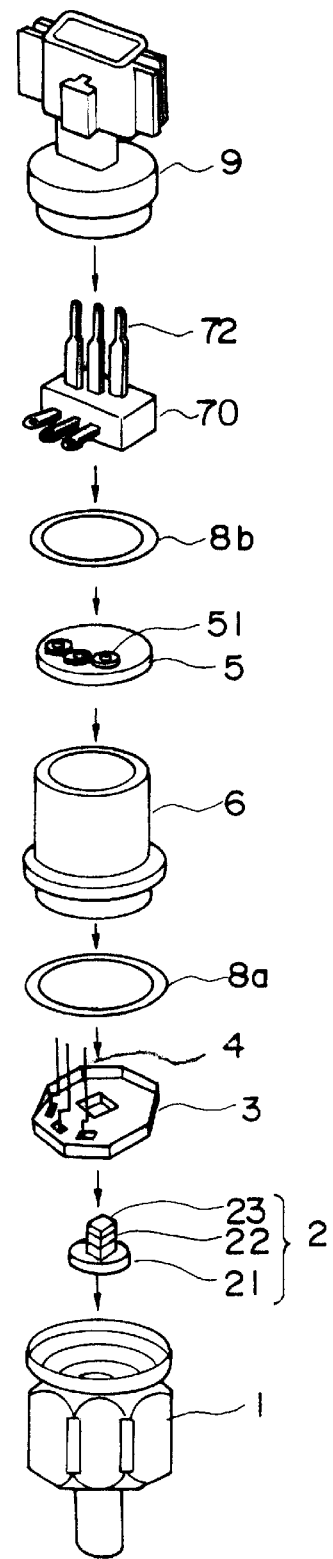

Fig. 13A
Fig. 13B
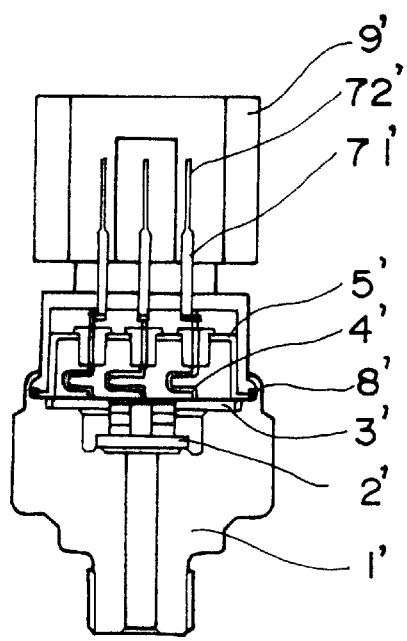
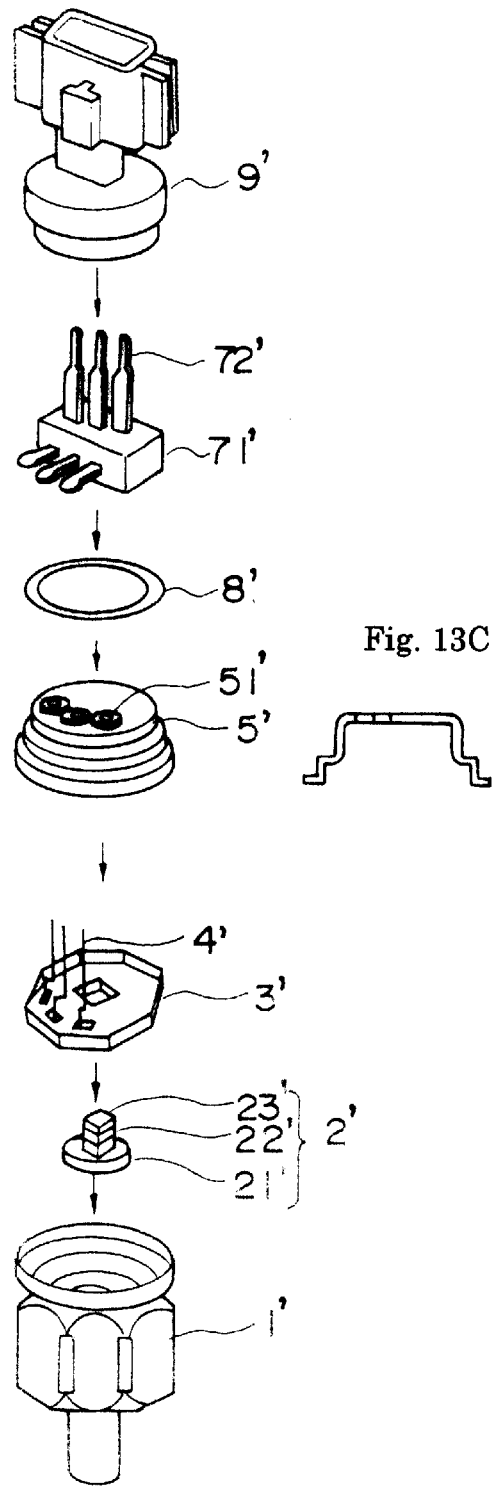
Fig. 13C

PRESSURE SENSOR INCLUDING A JOINT FOR CONNECTING A HOUSING AND CONNECTOR CASE TOGETHER

BACKGROUND OF THE INVENTION

The present invention relates to pressure sensors, and more specifically, to a pressure sensor comprising a housing and a connector case, storing in the interior thereof a sensor element for sensing pressure, a substrate having an amplifying thick-film board circuit, a lead connecting the sensor element and a terminal, a shield plate with a penetrating condenser, a terminal holder and a terminal, and a water-proof o-ring and so on.

In the prior art, a pressure sensor as shown in FIG. 13 was known. FIG. 13A is an explanatory cross-sectional view of a prior art pressure sensor, FIG. 13B is an explanatory exploded schematic view of the same pressure sensor, and FIG. 13C is an explanatory cross-sectional view of the shield member used for said pressure sensor.

This pressure sensor comprises a housing 1' and a connector case 9', and in the interior of a container formed by said housing 1' and the connector case 9', a sensor element 2' for sensing pressure, a substrate 3' having an amplifying thick-film board circuit, a lead 4' for connecting the sensor element 2' and a terminal 72', a shield member 5' having a penetrating condenser 51', a terminal holder 71' and a terminal 72', a water-proof o-ring 8', and so on are stored. The housing 1' and the connector case 9' are directly staked and connected together.

The housing 1' is a metallic case where the sensor element 2', the substrate 3', the shield plate 5', the connector case 9' and the like are assembled. The sensor element 2' comprises of a header 21', a seat 22' and a sensor chip 23', and mounted to the housing 1'. Further, the sensor chip 23' is formed to have a c-shaped cross section, which is set to deform when receiving a pressure of liquid from a hole formed on the housing 1' (not shown), and outputs an electric signal corresponding to the degree of deformation. The header 21' and the seat 22' support the sensor chip 23', and fixes the same to the housing 1'.

The substrate 3' is formed to have an octagonal shape, comprising an amplifying thick-film board circuit (not shown) for amplifying a weak signal from the sensor element 2', and the lead 4' is a wire including a power and a ground for transmitting the electric signal amplified by the amplifying thick-film board circuit to the terminal 72'.

The penetrating condenser 51' is for removing an electromagnetic noise intruding through the terminal 72' from the exterior thereof to the shield member 5', which is fixed to a hole formed on the shield member 5'. The shield member 5' is formed to have a c-shaped cross-section as is shown in FIG. 4(c), and fixed to the housing 1' by injection. Said member works as the exterior electrode of the penetrating condenser 51', and by being connected to the housing 1', removes the electromagnetic noise and the like from the terminal 72' to the exterior through the housing 1'.

The terminal holder 71' supports the terminal 72' by an insert mold, so as to withstand the connecting and removing movement of the connector. The terminal 72' is connected to the lead 4', and inputs or outputs the output signal from the power source, the ground and the sensor element 2' with the exterior.

The water-proof o-ring 8' is for preventing the intrusion of water or moisture and the like from the exterior, and is mounted on the portion for staking the housing 1' and the connector case 9'.

The connector case 9' is a case made of resin where the terminal 72' is inserted and fixed, which holds the shield plate 5' and the terminal holder 71'.

SUMMARY OF THE INVENTION

In the prior art pressure sensor, since the connector case 9' and the terminal 72' were formed as one unit (by injection method), it was necessary to change the whole structure of the pressure sensor when corresponding to the requirements regarding the shape of the pressure sensor from its users. Further, since the shield member 5' having a U-shape cross section is being injected and fixed to the housing 1', and since there was a need to fix the terminal holder 71' to a hole or a groove formed on the shield member 5', there was a problem that many steps were needed in order to manufacture the sensor, and the cost was expensive.

The present invention is aimed at solving the above problem, and the object of the present invention is to provide a pressure sensor whose members such as the housing, the sensor element, the substrate, the lead, the shield plate, the terminal holder, the terminal, the water-proof o-ring, the connector case and the like could be assembled easily, and where a change of design of the connector case could be easily performed.

Further, another object of the present invention is to provide a pressure sensor comprising a metallic housing having an interior space being connected to a pressure sensing space and a thin rising portion on the upper end thereof, a cylindrical metallic joint having an interior space, a separation wall for dividing said interior space into an upper space and a lower space, and a thin rising portion on the upper end thereof, and a connector case formed of an insulating material, wherein said housing, said joint and said connector case are piled up, the rising portion of each of the members being staked to form a unit structure, and in the interior space so formed are stored a sensor element for sensing pressure and an electrical circuit, wherein a shield plate is formed as a unit with said joint for connecting the housing and the connector case, so as to realize an easy assembling operation of the pressure sensor by reducing the number of members needed.

Further, the present invention is aimed at providing said pressure sensor wherein the fixing of the sensor element to the housing is carried out so as to provide a secure air-tight welded structure.

Still further, the present invention is aimed at providing said pressure sensor wherein a plurality of penetrating condensers are formed in a unit structure so as to reduce the number of necessary members and to reduce the manufacturing steps.

Further, the present invention is aimed at providing said pressure sensor wherein the rotation of the staked connecting portion between the housing and the joint, and the staked connecting portion between the joint and the connector case are prevented.

The present invention is a pressure sensor comprising a housing and a connector case, having in the interior thereof a sensor element for sensing a pressure, a substrate having an amplifying thick-film board circuit, a lead connecting the sensor element and a terminal, a shield plate with a penetrating condenser, a terminal holder and terminal, a water-proof o-ring and so on, wherein a joint is equipped having a staking portion against said housing and said connector case to an upper portion and a lower portion.

Further, the present invention characterizes in a pressure sensor wherein said shield plate is pinched between and fixed to the staking portion of said connector case and said joint.

Further, the present invention characterizes in a pressure sensor wherein said water-proof o-ring is mounted to said staking portion.

Further, the present invention is a pressure sensor comprising a housing and a connector case, having in the interior thereof a sensor element for sensing a pressure, a substrate having an amplifying thick-film board circuit, a lead connecting the sensor element and a terminal, a penetrating condenser, a terminal holder and terminal, a water-proof o-ring and so on, wherein a staking portion against said housing and said connector case is formed to an upper portion and a lower portion, further comprising a joint for fixing said housing and said connector case at said staking portions, and a shield portion for mounting said penetrating condenser formed in a unit structure with said joint.

The pressure sensor comprising a housing and a connector case according to the present invention could correspond flexibly to the need to change the shape or size and the like of the connector case, since a joint exists which connects the housing and the connector case. Further, a pressure sensor which could be assembled easily is gained.

Even further, the present invention characterizes in that said pressure sensor further comprises a liquid introduction hole connecting to the pressure sensing space opening in the bottom portion of said interior space and a circular protrusion mounted to a peripheral of the opening of said pressure introduction hole on the bottom portion are formed on the housing, and the sensor element is formed by piling a pressure detecting element formed on a semiconductor substrate, an upper seat made of glass, a lower seat made of silicon, and a metallic header, and an opening is formed to said joint for inserting said plurality of penetrating condensers, and the bottom surface of the header of said sensor element is positioned on said circular protrusion, the two members being welded airtightly together by an electrical resistance weld.

Further, the present invention characterizes in that said pressure sensor further comprises a tube extended portion formed on the lower surface of the header of said sensor element which fits to the liquid induction hole of the housing.

Even further, the present invention characterizes in that said pressure sensor further comprises the plurality of penetrating condensers being formed as one unit-type penetrating condenser.

The present invention characterizes in that said pressure sensor further comprises a rotation preventing structure mounted on said staking portion, said rotation preventing structure being either realized by forming protrusions on each of a shoulder portion on the outer peripheral of the joint and a shoulder portion on the outer peripheral of the connector case, the portion other than said protrusions being staked to form a remainder portion, or by forming notches to each of a shoulder portion on the outer peripheral of the joint and a shoulder portion on the outer peripheral of the connector case, the shoulder portion being staked to form a staking portion.

BRIEF DESCRIPTION OF THE DRAWINGS

FIG. 1A is a cross-sectional view showing one embodiment of the pressure sensor according to the present invention;

FIG. 1B is an exploded schematic view of the pressure sensor shown in FIG. 1A;

FIG. 13A and FIG. 13B is a cross-sectional view and an exploded schematic view showing the pressure sensor of the prior art; and FIG. 13C is a cross-sectional view of the shield portion of the prior art pressure sensor.

PREFERRED EMBODIMENT OF THE INVENTION

The embodiment of the present invention will now be explained with reference to the drawings.

Figure 2:
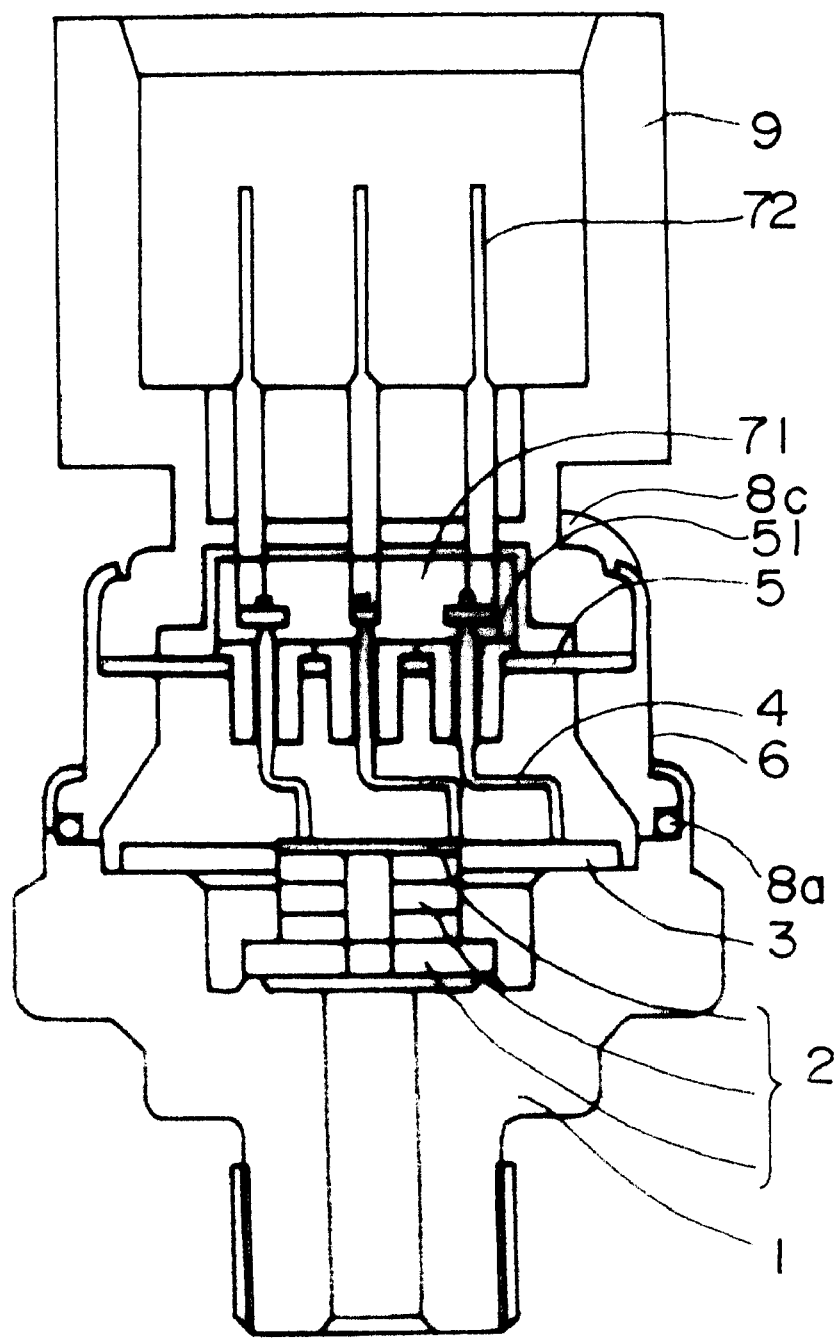
FIG. 2 is a cross-sectional view showing a deformed example of the embodiment shown in FIG. 1A.

FIG. 1A is an explanatory cross-sectional view showing one embodiment of the pressure sensor, FIG. 1B is an explanatory exploded schematic view of the pressure sensor, and FIG.2 is an explanatory cross-sectional view of a deformed example of the pressure sensor.

In FIGS. 1 and 2, the pressure sensor is formed of a housing 1, a sensor element 2, a substrate 3, a lead 4, a shield plate 5 with a penetrating condenser 51, a joint 6, a terminal holder 70, a terminal 72, a water-proof o-ring 8a and 8b, a connector case 9, and so on. In the container formed by the housing 1, the joint 6 and the connector case 9, the sensor element 2, the substrate 3, the lead 4, the shield plate 5 with the penetrating condenser 51, the terminal holder 70, the terminal 72, the water-proof o-ring 8a and 8b and the like are stored.

The housing 1 is a metallic case assembling the sensor element 2, the substrate 3, the shield plate 5, the connector case 9 and the like, with a hole (not shown) for introducing a liquid to be measured to the interior thereof. The sensor element 2 comprises of a header 21, a seat 22 and a sensor chip 23, and is mounted to the housing 1. The sensor chip is formed to have a c-shaped cross-section, and is set to deform when receiving pressure from the liquid introduced from the hole mounted on the housing 1, and according to the degree of deformation, outputs an electric signal. The header 21 and the seat 22 support the sensor chip 23, and are fixed to the housing 1.

The substrate 3 is formed to have a regular octagonal shape, having an amplifying thick-film board circuit (not shown) for amplifying the weak signal from the sensor element 2, and the lead 4 is a wire including a power source and a ground for transmitting the electric signal amplified by the amplifying thick-film board circuit to the terminal 72. The amplifying thick-film board circuit is the same as the prior art, so detailed description thereof is omitted.

The penetrating condenser 51 is for preventing the electromagnetic noise intruding through the terminal 72 from the exterior, and is mounted on a hole formed on the shield plate 5. The shield plate 5 is of a plate shape, which is pinched between and fixed to the staking portion of the connector case 9 and the joint 6. This acts as the exterior electrode of the penetrating condenser 51 and connected to the housing 1, in order to release the electromagnetic noise from the terminal 72 through the housing 1 to the exterior portion.

The joint 6 is formed of the same material as the housing 1, which is formed in a cylindrical shape. This is a member for connecting the housing 1 and the connector case 9, having a staking portion against the housing 1 and the connector case 9 on its upper and lower portions.

The terminal holder 70 supports the terminal 72 by an insert molding, which is formed to withstand the connecting and removing of the connector. The terminal 72 is connected to the lead 4, inputting and outputting the output signal from the sensor element 2, the power source and the ground with the exterior.

The water-proof o-rings 8a and 8b are for preventing the intrusion of water or moisture and the like from the exterior, which are mounted to the portion staking the housing 1 and the joint 6, and the connector case 9 and the joint 6.

The connector case 9 is a resin case for inserting and fixing the terminal 72, which holds the shield plate 5 and the terminal holder 70. Further, the case is formed to correspond to a variety of differently shaped connectors.

The present embodiment utilizes a joint 6, so when there is a change in size of the housing 1 and the connector case 9 at the time of assembling the pressure sensor, it is capable of corresponding flexibly by the existence of the joint 6. Further, the shield plate 5 which was injected and fixed in the prior art is to be pinched and fixed at the time of staking the connector case 9 and the joint 6, which enables easier assembly.

Further, since there is no need to use a groove or a hole and the like when fixing the terminal holder 70, the manufacturing steps could be simplified, and the cost could be reduced.

Since it is possible to form into parts the combination of members such as the shield plate 5 and the penetrating condenser 51, or the terminal holder 70 and the terminal 72 and so on, which enables an easier assembling operation.

Further, by forming the electrical circuit portion to be completely surrounded by the shield plate 5 and the joint 6, it is possible to create a structure where no electric noise or electromagnetic noise would enter the electrical circuit, which is effective for preventing operational error. Further, the noise intruding from the terminal 72 could be prevented by the penetrating condenser 51.

Further, instead of mounting the water-proof o-ring 8b to the staking portion, as is shown in FIG. 2, the outer peripheral of the staking portion could be covered by a water-proof agent 8c such as a silicon-system adhesive and the like.

Figure 3A:
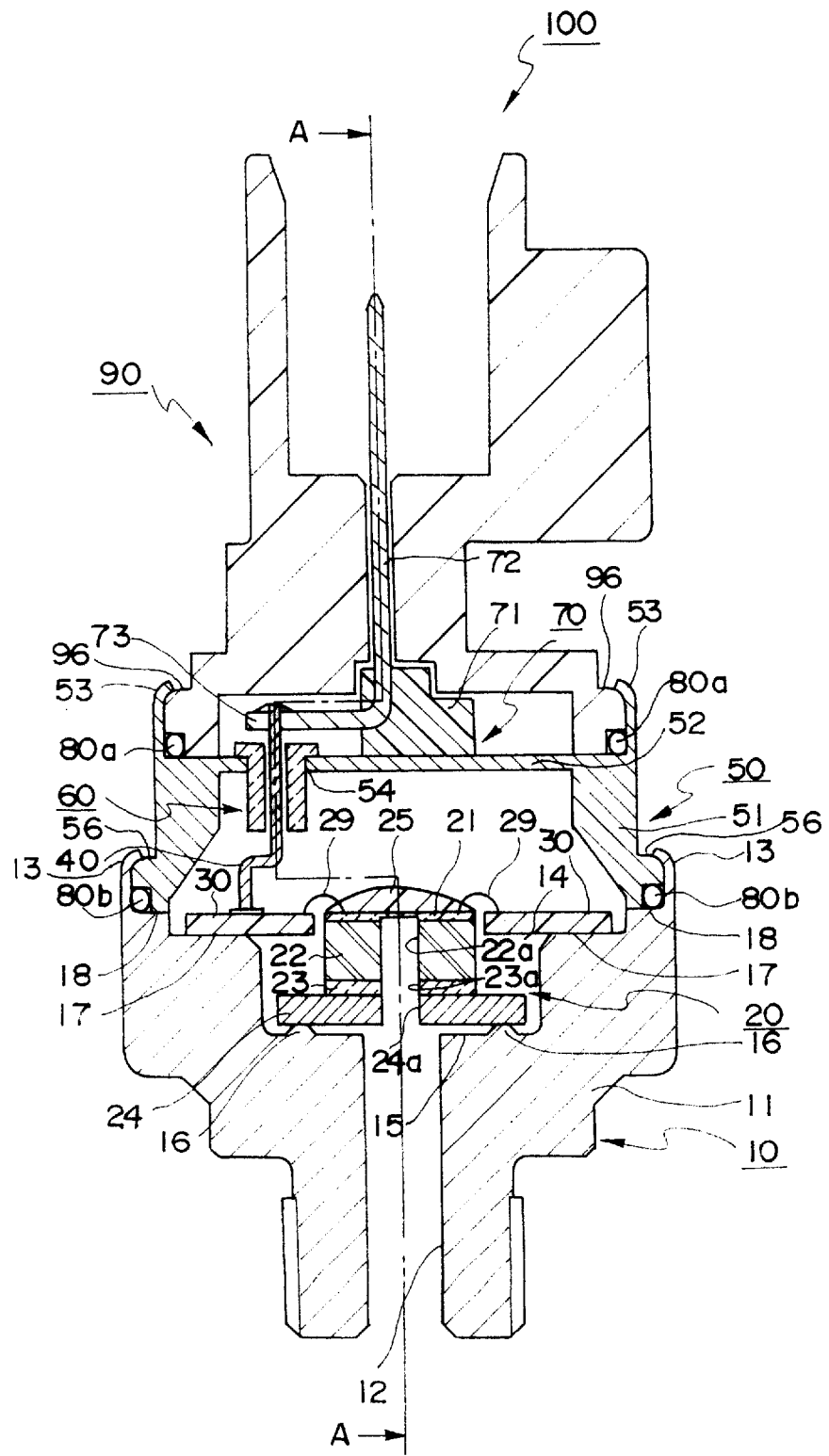
FIG. 3A is a cross-sectional view showing another embodiment according to the present invention.
Figure 3B:
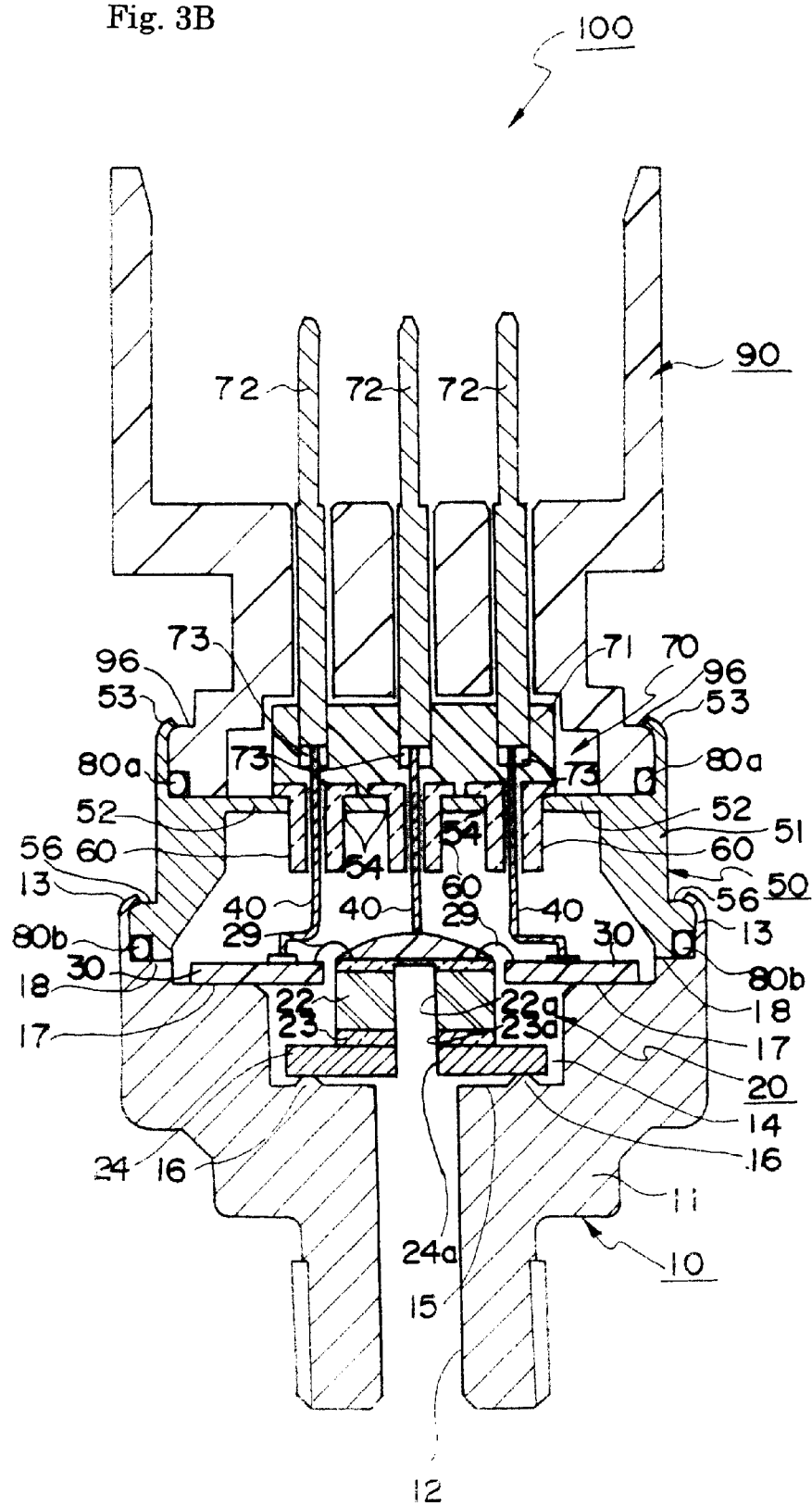
FIG. 3B is a cross-sectional view of the embodiment shown in FIG. 3A being rotated by 90 degrees.
Figure 3C:
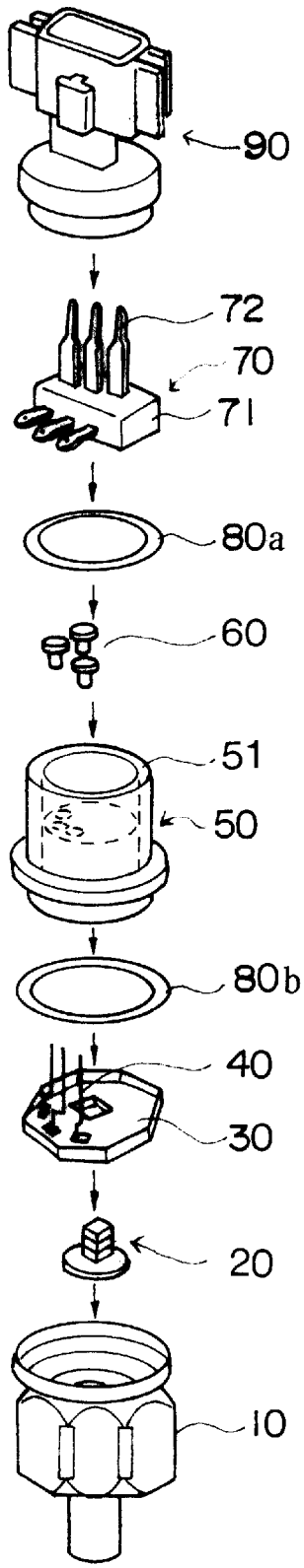
FIG. 3C is an exploded schematic view of the embodiment shown in FIG. 3A.
Figure 3D:
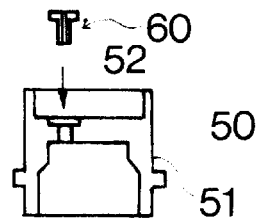
FIG. 3D is a cross-sectional view of the shield portion.

Next, FIGS. 3A through 3D are used to explain another embodiment of the pressure sensor according to the present invention. FIG. 3A is a cross-sectional view showing the structure of the pressure sensor, and FIG. 3B is a cross-sectional view taken along line A—A of FIG. 3A showing the structure of said pressure sensor. FIG. 3C is an explanatory exploded schematic view of the pressure sensor shown in FIG. 3B, and FIG. 3D is an explanatory cross-sectional view of the joint used in said pressure sensor.

In the drawing, a pressure sensor 100 comprises a housing 10, a sensor element 20, a circuit board 30, a lead 40, a joint 50, a penetrating condenser 60, a terminal holder 70, a connector case 90, and so on.

Inside a container formed by the housing 10, the joint 50 and the connector case 90 are stored the sensor element 20, the circuit board 30, the lead 40, the penetrating condenser 60, the terminal holder 70, and o-rings 80a and 80b.

The housing 10 is formed as a metallic case having a cylindrical shape for assembling the sensor element 20, the circuit board 30, the joint 50 and the like, comprising a body 11, a liquid induction hole 12 for inducting the liquid to be measured to the interior portion, a thin rising portion formed on the peripheral upper edge, an interior space 14 formed in the interior of the body, a bottom portion 15 of the interior space, a circular protrusion 16 mounted in the peripheral of the liquid induction hole 12 opened on said bottom portion, a first step portion 17 formed on the upper area of the interior space 14, and a second step portion 18 formed on the upper area of said step portion 17.

The sensor element 20 holds a function for sensing pressure, and is comprised of a pressure sensing element 21 formed of piezoelements mounted on the upper surface of a semiconductor board forming a bridge by a plurality of resists, an upper seat 22 made of glass where said pressure sensing element 21 is airtightly mounted and fixed to the upper surface thereof, a lower seat 23 made of silicon airtightly fixed to the lower surface of said upper seat 22, and a header 24 where said lower seat is airtightly mounted and fixed to the upper surface. thereof.

The pressure sensing element 21 is formed so that the plane shape of said semiconductor board is rectangular, and at the center portion thereof is formed a diaphragm portion which is thin and which would be deformed by pressure, on the upper surface of said diaphragm portion is formed a pressure sensing portion which is a strain gauge formed by mounting a plurality of resists in a bridge state so as to create a piezoresistor element, and further having on the thick portion in the peripheral area an electric circuit such as an amplifying circuit and a calculating processing circuit manufactured by an integrated circuit manufacturing technique.

Further, after connecting a land portion not shown formed on the upper surface of the pressure sensing element 21 and a land portion not shown formed on the upper surface of the circuit board 30 by a bonding wire 29, a dampproof protection layer 25 is formed on the upper surface thereof made of silicon resin and the like for protecting the electric circuits such as the resists mounted on the upper surface of the pressure sensing element 21.

The upper seat 22 formed of a glass material such as a Pylex grass (registered trademark) has a rectangular plane shape, and formed to have a penetrating hole 22a on the center portion thereof.

The lower seat 23 made of silicon has a rectangular plane shape, and formed to have a penetrating hole 23a on the center portion thereof. On the conjunction surface of the lower seat 23 to the header 24 is mounted a gold plated layer formed by gold sputtering and the like.

The header 24 is formed by using an iron-nickel alloy such as 42 alloy and the like, having a circular plane shape, and formed to have a penetrating hole 24a on the center portion thereof concentric to the liquid inducing hole 12. On the conjunction surface of the header 24 and the lower seat 23 is mounted a gold plate layer.

The penetrating holes 22a, 23a and 24a of said upper seat 22, said lower seat 23 and said header 24 are formed on the same axis, and are communicated to the liquid induction hole 12 of the housing 10.

The lower surface of the pressure sensing element 21 is airtightly welded and fixed to the upper surface of the upper seat 22 by an anode conjunction (FAB conjunction), and the lower surface of said upper seat 22 is airtightly welded and fixed to the upper surface of the lower seat 23 by an anode conjunction. The lower surface of said lower seat 23 and the upper surface of the header 24 is heated and pressed (scrubbed) with a blazing material of gold-silicon positioned in between, so as to be airtightly welded and fixed together, forming a gold-silicon alloy.

The circuit board 30 is formed of an insulating resin and the like having an octagonal shape, with an opening on the center portion thereof for placing said sensor element 20. On said circuit board 30, a circuit element forming an amplifying circuit and a calculating circuit and the like not shown in the drawings are mounted, and the signal from the pressure sensing element 21 is inputted to said circuit element through a bonding wire 29.

The lead 40 is a wire for connecting the input/output terminal (land portion) mounted on the electric circuit board 30 and the terminal 72, including a signal wire, a power supply wire and a ground wire. The base of the lead wire 40 is mounted on the land portion formed on the circuit board 30 not shown, and electrically connected and fixed thereto by soldering and the like.

The joint 50 is formed of the same metal as the housing 10, which holds a function as a shield portion protecting the sensor element 20 positioned in the interior space 14 formed of the housing and the like from exterior noise, and a function as a connecting member for connecting to the housing 10 the connector case 90 in a single unit structure.

The joint 50 comprises a cylindrically shaped body 51, a separation wall 52 formed in a unit structure with the body 51 for dividing the interior space of the cylinder into two parts, a thin rising portion 53 which is formed to stand on the peripheral upper edge of the body 51, a plurality of openings 54 formed on one part of the separation wall, a shoulder portion 56 mounted on the lower outer peripheral portion of the body, a connector storing space formed on the upper area of the separation wall, and an interior space for storing the sensor element formed on the lower area of the separation wall.

The joint 50 shown in FIG. 3 is a member for connecting the housing 10 and the connector case 90, comprising a staking portion against the housing 10 and the connector case 90 on its upper and lower portions. A brass for example is used as its material, and the material is formed for example by cutting into a cylindrical shape having a separation wall 52 61b. The separation wall 52 is formed in a unit to a plate-shape having a hole for inserting the penetrating condenser 60, and the thickness is, for example, approximately 0.6 to 1 mm. Further, by being connected to the housing 10 working as an external electrode of the penetrating condenser 60, the electromagnetic noise from the terminal 72 could be removed to the exterior through the housing 10.

A joint 50 is used as above, so when assembling the pressure sensor, even if there is a change to the size of the housing 10 and the connector case 90, the existence of the joint 50 makes it possible to correspond to such matters flexibly. Further, since the shield plate or separation wall 52 is formed as one unit with the joint 50, the number of members could be reduced, which makes the assembling operation easier.

Further, in the above-explained embodiment, it is possible to form a protrusion (not shown) to either the connector case 9, 90 or the joint 6, 50, and a concave (not shown) to the other member corresponding to said protrusion, which not only makes the positioning operation easier when assembling the pressure sensor, but also provides a firm fix against twisting. As for the housing 10 and the joints 6, 50, it is also possible to form a protrusion or concave to each member similarly.

Figure 4:
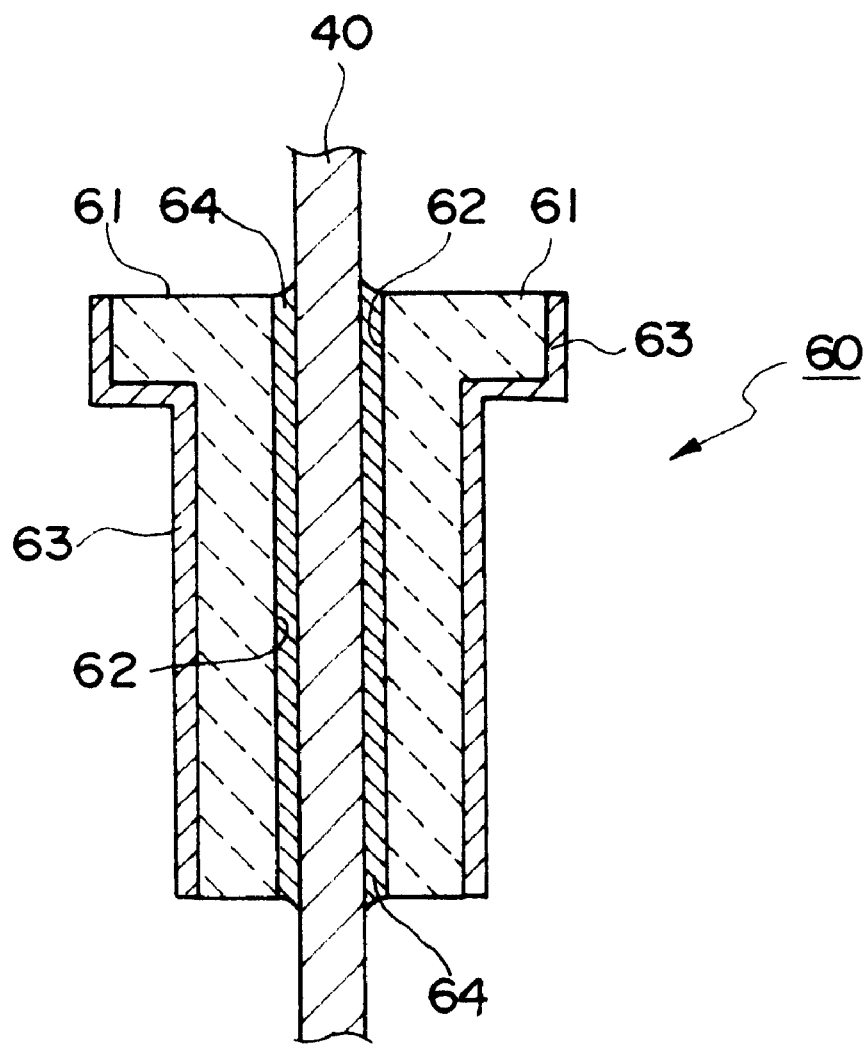
FIG. 4 is a cross-sectional view explaining the structure of the penetrating condenser used in the pressure sensor according to the present invention.

The penetrating condensers 60 comprise a structure as shown in FIG. 4 for preventing the influence of electromagnetic noise intruding from the exterior through the terminal 72 by bypassing the noise to the housing 10 by way of the joint 50, which are inserted to the openings 54 formed on the separation wall 52.

The penetrating condenser 60 comprises a cylindrical pipe body 61 having a penetrating hole 62 on the center portion thereof which is formed by molding a dielectric, and an exterior electrode 63 mounted on the outer portion thereof, wherein a lead 40 is inserted through the penetrating hole 62, and the gap formed between said lead 40 and the dielectric is filled by flowing in solder and the like, forming an interior electrode 64. Said penetrating condenser 60 is fixed by soldering to the opening 54 formed on the separation wall 52 of the joint 50. The exterior electrode 63 of the penetrating condenser is electrically connected to the housing 10 through the separation wall 52, so as to bypass the electromagnetic noise intruding from the terminal 72 to the exterior through the housing 10.

The terminal holder 70 is comprised of a base body 71 gained by molding an insulating resin, and a terminal 72 formed of a conductor bent to an L-shape, wherein said terminal 72 is supported by the base body 71 by insert molding with the upper and lower ends protruding therefrom. On the lower end portion 73 of the terminal 72, an opening for inserting an apex portion of the lead 40 is formed.

The terminal 72 is connected to the land portion of the circuit board 30 by inserting and soldering the lead 40 to the opening formed on the lower end portion 73, wherein the power wire and the groundwire are used for supplying electrical power to the electrical circuit, and the ground wire and the signal wire are used for taking out the output signal from the sensor element 20 to the exterior.

The o-rings 80a and 80b formed of silicon rubber and the like are for preventing the intrusion of water or moisture and the like from the exterior, which are each mounted on the portion where the housing 10 and the joint 50 or the connector case 90 and the joint 50 are staked.

The connector case 90 is a case made of resin for inserting and fixing the terminal 72, comprising a socket space formed on the upper portion thereof, a terminal holder space formed on the lower portion thereof, a shoulder portion 96 mounted on the lower area on the exterior side, and an opening for inserting the terminal, which supports the terminal holder 70 together with the separation wall 52.

This connector case 90 is capable of corresponding to a variety of differently shaped connectors by changing its design.

The steps for assembling the pressure sensor using the above-explained components will now be explained.

On the protrusion 16 formed on the bottom portion 15 of the interior space 14 in the housing 11, the header 24 of the sensor element 20 is mounted having a pressure sensing element positioned on the seat comprised of an upper seat and a lower seat welded together, the lower seat being fixed by heat to the header 24, wherein an electrode which has a shape similar to the shape of the protrusion 16 is pressed onto the header, and a large current is flown between the header 24 and the housing body 11, performing an electrical resistance weld by the Joule heat, and welding the sensor element 20 (the header 24) onto the protrusion 16 airtightly.

Next, the circuit board 30 where circuit elements are mounted and fixed forming an electric circuit is fixed on the first step portion 17 of the interior space 14 inside the housing by an adhesive and the like, and then the land portion of the pressure sensing element 21 and the land portion of the circuit board 30 are connected by the bonding wire 29. Thereafter, pressure is added through the liquid induction hole 12, and while watching the output of the lead 40, trimming is performed by laser beam to the resist element and the like on the electric circuit mounted on the thick portion forming the pressure sensing element 21 in order to adjust the output.

Then, a silicon resin is applied to the surface of the pressure sensing element 21 and the surface of the circuit board 30, forming the dampproof protection layer 25.

Next, the lead 40 is positioned and fixed by soldering to the opening 60 of the penetrating condenser 60 fixed to the joint 50, and the joint 50 is mounted to the second step portion 18 of the interior space in the rising portion 13 of the housing 10.

Then, the rising portion 13 is staked to the shoulder portion 56 of the joint 50, fixing the housing 10 and the joint 50 together.

Next, solder is flown into the gap formed between the opening 62 of the penetrating condenser 60 and the lead 40, forming the interior electrode 64.

Thereafter, the apex portion of the lead 40 penetrating through the penetrating condenser 60 is inserted and soldered to the opening formed on the lower end 73 of the terminal 71 in the terminal holder, and the base portion 71 of the terminal holder 70 is mounted to the separation wall 52.

Then, the terminal 72 is inserted to the opening formed on the connector case 90, and the lower end of the connector case 90 is positioned on the separation wall 52 of the joint 50. Then the rising portion 53 of the joint 50 is staked to the shoulder portion 96 of the connector case in order to fix the joint 50 and the connector case 90 together.

The pressure sensor 100 is assembled by the above steps.

In the present embodiment, the header 24 of the sensor element 20 is mounted on the circular protrusion 16 formed to the bottom portion 15 of the interior space 14 in the housing 11, and it is welded and fixed thereto by electrical resistance weld. Therefore, the welding of the header 24 to the protrusion 16 is extremely strong, and a pressure sensor showing good airtight characters could be provided.

Further, a joint 50 having a separation wall 52 is used in the present invention, which enables to correspond flexibly to the change of size of the housing 10 and the connector 90. Further, since the shield plate fixed by injection to the side wall of the interior space in the housing is formed as one unit with the joint 50, the joint 50 and the separation wall 52 could be fixed simply by mounting the joint to the second step portion 18 of the housing 11 and then staking the shoulder portion 56 by the rising portion 13, so the number of steps necessary for assembly could be reduced.

Further, according to the present embodiment, the position of the terminal holder 70 could be fixed by being mounted onto the separation wall 52 and being soldered to the lead 40, so not many steps is necessary for manufacturing the pressure sensor, which reduces the cost efficiently.

Even further, according to the present embodiment, it is possible to form into parts the combination of members such as the separation wall 52 and the penetrating condenser 51, or the terminal holder 70 and the terminal 72 and so on, which enables an easier assembling operation.

According to the present embodiment, by forming the electrical circuit portion to be completely surrounded by the separation wall 52 and the joint 50, it is possible to create a structure where no power source noise or electromagnetic noise would enter the electrical circuit, which is effective for preventing operational error. Further, the noise intruding from the terminal 72 could be prevented by the penetrating condenser 60.

Further, instead of mounting the o-rings 8a and 8b to the staking portion, the outer peripheral of the staking portion could be covered by a water-proof agent such as a silicon-system adhesive and the like.

Figure 5:
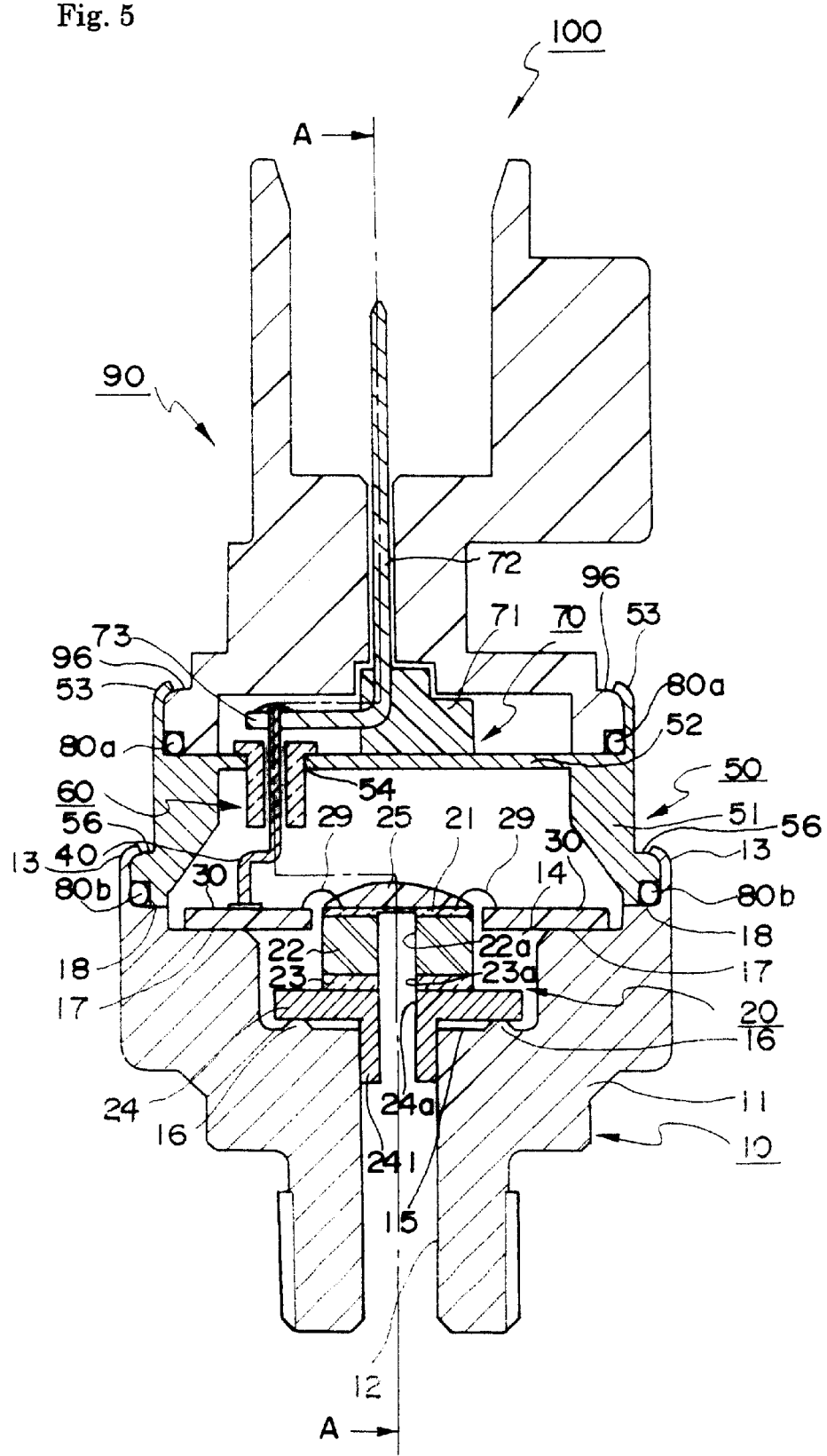
FIG. 5 is a cross-sectional view of another embodiment of the pressure sensor according to the present invention.
Figure 6:
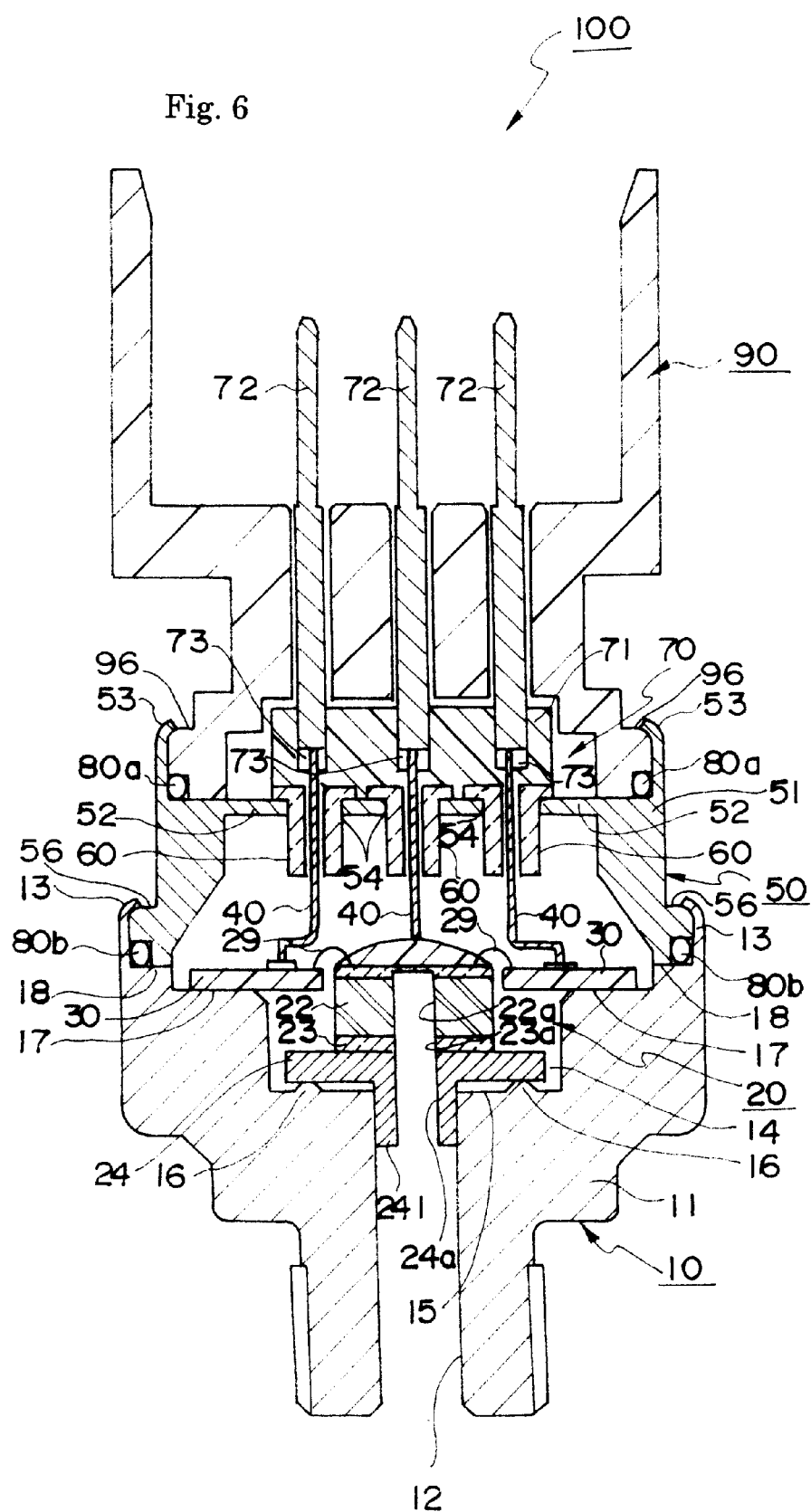
FIG. 6 is a cross-sectional view of the pressure sensor shown in FIG. 5 being rotated by 90 degrees.

FIGS. 5 and 6 are used to explain another embodiment of the present invention. FIG. 5 is a cross-sectional view showing the structure of the pressure sensor, and FIG. 6 is a cross-sectional view taken along line A—A of FIG. 5 showing the structure of said pressure sensor.

Compared to the pressure sensor as shown in FIGS. 3A and 3B, the present embodiment characterizes in that a tube extended portion 241 extending in the downward direction is mounted on the header 24 as shown in the drawing. The other structure is almost the same as the pressure sensor shown in FIGS. 1 and 2, and the same components are provided with the same reference numbers, the explanation of which are omitted.

The pressure sensor 100 of the present embodiment is characterized in that the outer diameter of the tube extended portion 241 of the header 24 is formed to fit to the liquid induction hole 12 of the housing 10, and after said tube extended portion 241 is fit to said liquid induction hole 12, the header 24 and the protrusion 16 are welded together by an electrical resistance weld similarly as the first embodiment shown in FIGS. 3A and 3B.

The other structures and manufacturing steps are similar to the first embodiment shown in FIGS. 3A and 3B, the explanation of which are omitted.

According to the present embodiment, the tube extended portion 241. is fixed by fitting for example to the liquid induction hole 12, so even if stress is added repeatedly to the conjunction portion of the header 24 and the protrusion 16 when measuring pressure, since the outer peripheral of the trailing portion 241 of the header 24 and the liquid induction hole 12 is fixed at the fit area, the fear of parting occurring to the conjunction caused by long term use could be reduced greatly. Therefore, the reliability of the pressure sensor could be improved.

Figure 7:
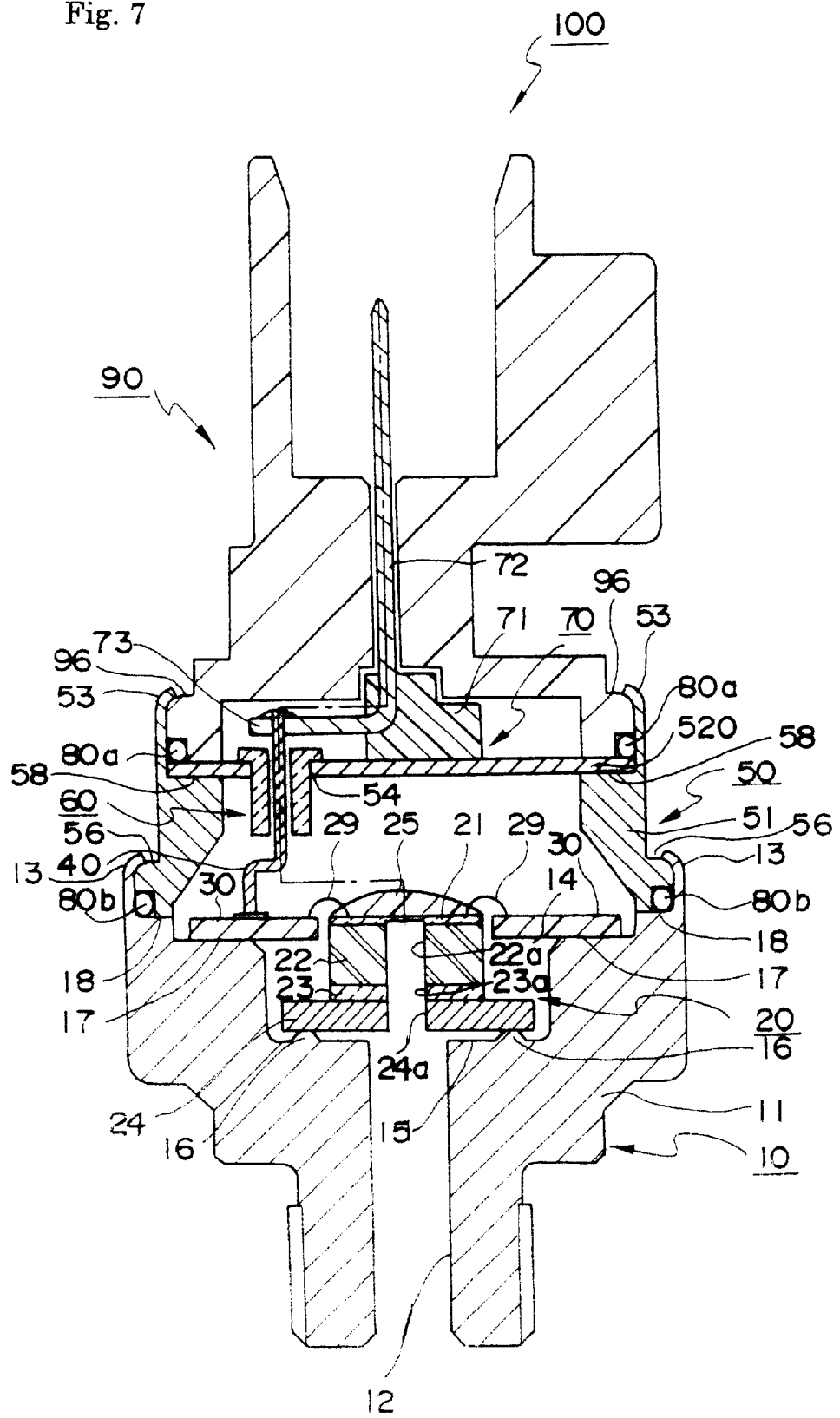
FIG. 7 is a cross-sectional view of the pressure sensor of yet another embodiment of the present invention.

FIG. 7 is used to explain yet another embodiment of the present invention.

This embodiment is characterized compared to the pressure sensor shown in FIGS. 3A and 3B, where the separation wall 52 is formed as one unit with the joint 50, which in this embodiment is formed separately as a shield plate 520, as is shown in the drawing. In other words, the present embodiment is characterized in that the shield plate is pinched and fixed to the staking portion between the connector and the joint. The other structure is similar to that of the pressure sensor shown in FIGS. 3A and 3B, and the same components are provided with the same reference numbers, the explanation of which are omitted.

In the present embodiment, a shield plate mounting step 58 is formed on the joint 50, and on this step portion 58 is mounted a shield plate 520.

In order to prevent the rotation of the shield plate 520, a protrusion or a concave not shown in the drawing could be formed on the shieldplate 520, and on the shield plate mounting step 58 of the joint 50, a concave to be matched to the protrusion formed on said shield plate 520, or a protrusion to be matched to the concave formed on said plate 520 could be equipped.

The other structures and manufacturing steps are similar to that of the first embodiment shown in FIGS. 3A and 3B, the explanation of which are omitted.

In the present embodiment, similar to the embodiment shown in FIGS. 3A and 3B, the header 24 of the sensor element 20 is formed to have a flat bottom shape. However, the same effect could be gained when the bottom surface of the header 24 is formed to have a shape similar to that of the embodiment shown in FIG. 5 where a tube extended portion 241 is formed on the bottom surface thereof.

Figure 8A:
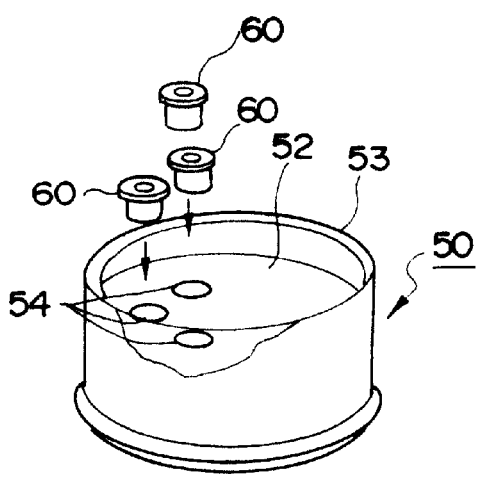
FIG. 8A is a schematic view explaining the mounting state of the penetrating condenser.
Figure 8B:
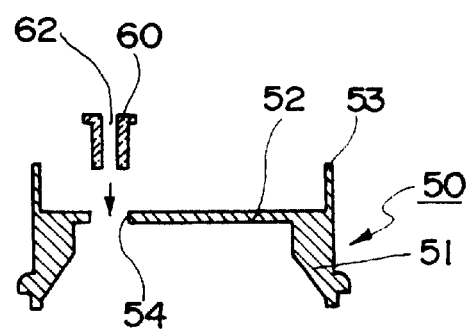
FIG. 8B is a cross-sectional view of the mounting state of FIG. 8A.

FIGS. 8 through 10 are used to explain yet another embodiment of the present invention. FIGS. 8 and 9 show the relations between the penetrating condenser and the joint, wherein FIG. 8A shows a schematic view of the penetrating condensers and the joint, and FIG. 8B shows the cross-sectional view thereof.

The present embodiment is characterized in that the plural number of penetrating condensers 60 are formed as one unit, and provided as a single member.

As is shown in FIG. 8A, the plurality of penetrating condensers 60 are fixed by soldering the condensers one by one to the opening 54 formed on the separation wall 52 of the joint 50, and then the lead 40 was inserted through the penetrating hole 62.

Figure 9A:
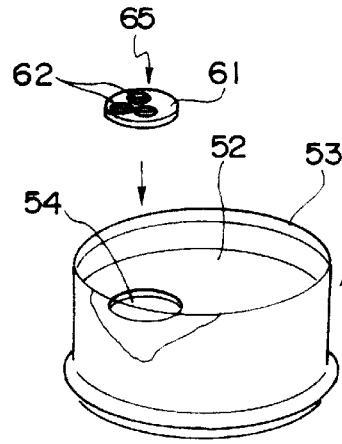
FIG. 9A is a schematic view explaining the mounting state of the unit-type penetrating condenser.
Figure 9B:
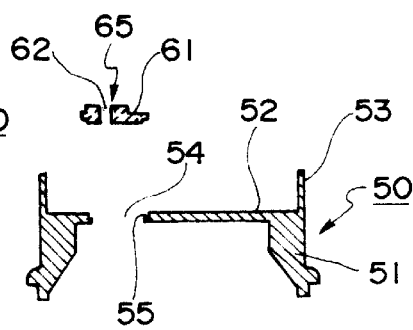
FIG. 9B is a cross-sectional view of the mounting state of FIG. 9A.

FIG. 9A is a schematic view of the penetrating condenser and the joint, and FIG. 9B is a cross-sectional view thereof. As is shown in FIG. 9A, the present embodiment characterizes in that the plural number of penetrating condensers are gathered as one unit, forming a unit-type penetrating condenser 65. The unit-type penetrating condenser 65 forms the dielectric 61 to have a flat shape, wherein a plurality of penetrating holes 62 are formed on said dielectric 61 in a position corresponding to the openings of the lower end portion 73 of the terminal 72, and further mounting one exterior electrode common to the plurality of penetrating condensers on the outer peripheral of the dielectric 61.

In the present embodiment, the opening 54 formed on the separating wall 52 of the joint 50 is set to have the same shape as the dielectric 61, with a receiving portion 55 formed on the lower area of the opening.

Such structure enables reduction of the number of members used, which leads to reduction of the manufacturing steps.

Figure 10A:
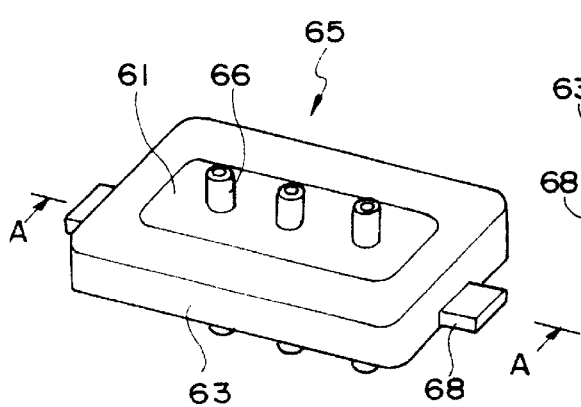
FIG. 10A is a schematic view explaining another embodiment of the unit-type condenser.
Figure 10B:
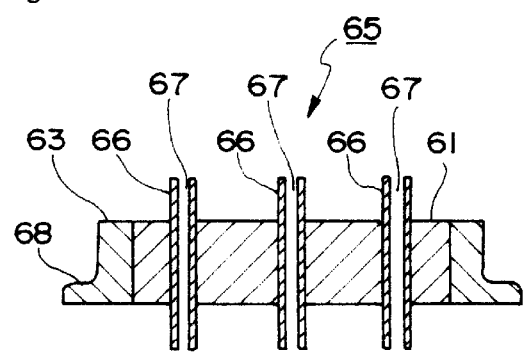
FIG. 10B is a cross-sectional view explaining another embodiment of the unit-type condenser.

FIG. 10 shows another embodiment of the unit-type penetrating condenser 65 where the plurality of penetrating condensers are formed as one unit, wherein FIG. 10A is a schematic view showing the exterior shape, and FIG. 10B is a cross-sectional view showing the structure thereof.

This unit-type penetrating condenser 65 comprises a flat rectangle-shaped dielectric 61, and a plurality of conductive metallic pipes 66 having a penetrating hole 67 in the inner portion formed on the dielectric 61 so as to penetrate the dielectric to the upper and lower directions so as to form an interior electrode for each of the penetrating condensers, and a metal frame working as the common exterior electrode 63 is fit for example to the outer peripheral of the dielectric 61.

Further, a fixing member 68 for fixing to the separation wall is formed on the lower portion of the metal frame.

According to the present embodiment, the effect similar to that of the fourth embodiment could be gained.

FIG. 11 is used to explain another embodiment of the present invention.

The pressure sensor shown in the above-mentioned embodiments are formed so that the housing 10 and the joint 50 are fixed by staking the rising portion 13 of the housing 10, and the joint 50 and the connector case 90 are fixed by staking the rising portion 53 of the joint 50.

In the case where members both having a cylindrical shape is fixed by staking, even if the staking was performed firmly, when different rotational force is provided to the members after being used for a long time, there is fear that the staking portion may be rotated. When such rotation occurs to the pressure sensor, force twisting the lead 40 positioned in the interior thereof is provided thereto, and defect may occur to the conjunction between the lead 40 and the circuit board 30, or the conjunction between the lead 40 and the lower portion of the terminal 72.

The present embodiment is aimed at solving such problems by a structure preventing rotational movement between the housing 10 and the joint 50, or the joint 50 and the connector case 90.

Figure 11A:
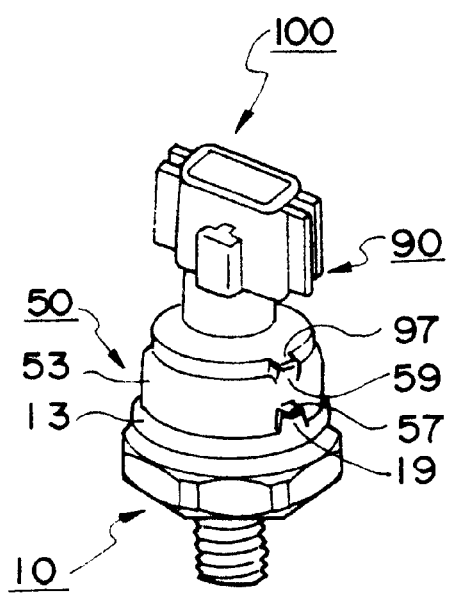
FIG. 11A is a schematic view explaining the structure of one embodiment of the rotation preventing structure of the pressure sensor according to the present invention.
Figure 11B:
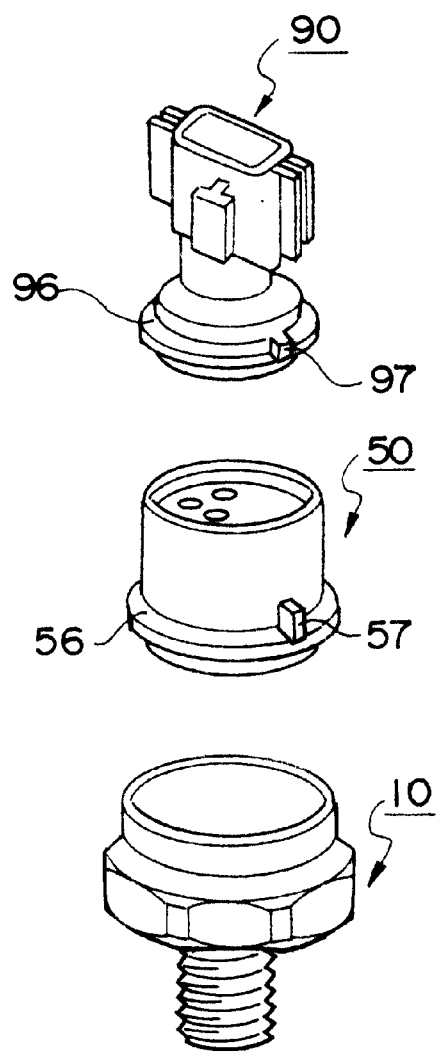
FIG. 11B is an exploded schematic view of the rotation preventing structure shown in FIG. 11A.

FIG. 11A is a schematic view showing the whole structure of the pressure sensor 100, and FIG. 11B is an exploded schematic view showing the assembly of each of the components forming the pressure sensor.

The present embodiment is characterized in that one or more protrusions 57 are mounted on the shoulder portion 56 of the joint 50 and that one or more protrusions 97 are mounted on the shoulder portion 96 of the connector case 90.

The assembling method of the present embodiment will now be explained. First, the sensor element 20 and the circuit board 30 are placed on the predetermined position in the interior space 14 of the housing 10. Then, the joint 50 is positioned so as not to provide strain to the lead 40, then the lead 40 is inserted to the penetrating hole of the penetrating condenser 60, placing the same to the second shoulder portion 18 of the housing 10. Next, the upper end of the rising portion 13 on the housing 10 is staked. At this time, no staking power is provided to the outside of the protrusion 57 mounted on the shoulder portion 56 of the joint, thereby creating a remainder portion 19 which is not staked on the protrusion 57 of the rising portion 13.

Next, the opening of the terminal bottom end portion 73 of the terminal holder 70 is positioned and soldered to the end of the lead 40 penetrating through the penetrating condenser 60, and then the terminal 72 is inserted to the terminal penetrating hole formed on the connector case 90, positioning the connector case 90 on the separation wall 52 of the joint 50. Thereafter, the upper end of the rising portion 53 on the joint 50 is staked. At this time, no staking power is provided to the outside of the protrusion 97 mounted on the shoulder portion 96 of the connector case 90, thereby creating a vertical crack on the rising portion 53, forming a remainder portion 59 which is not staked on the outside of the protrusion 97.

The edge surface of the crack occurring to the staking portion side of the rising portion 13 and the rising portion 53 each run against the side surface of the protrusion 57 and the protrusion 97, preventing the rotation occurring between the housing 10 and the joint 50, or the joint 50 and the connector case 90.

FIG. 12 is used to explain yet another embodiment of the present invention.

The present embodiment is formed to have a structure for preventing the rotation between the housing 10 and the joint 50, or the joint 50 and the connector case 90.

Figure 12A:
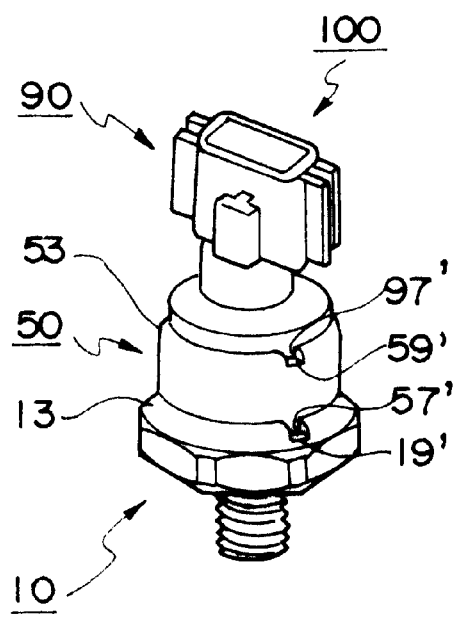
FIG. 12A is a schematic view explaining another embodiment of the rotation preventing structure of the pressure sensor according to the present invention.
Figure 12B:
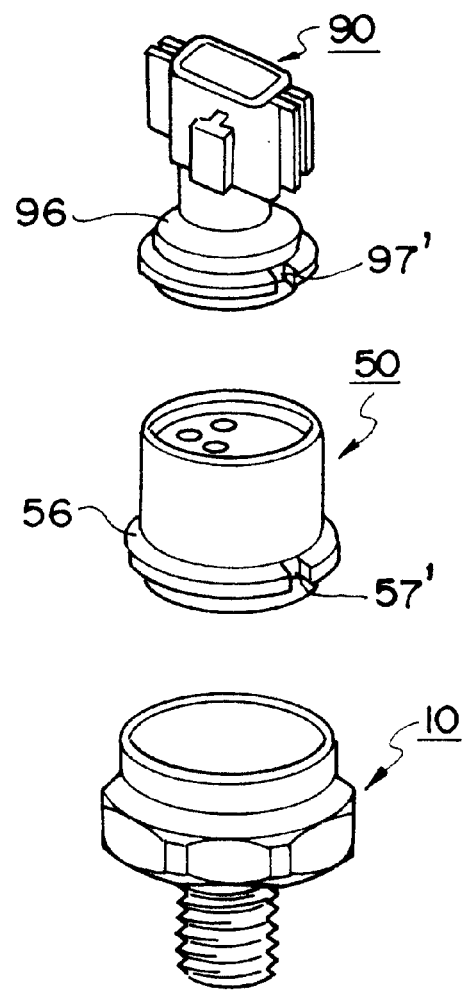
FIG. 12B is an exploded schematic view of the rotation preventing structure shown in FIG. 12A.

FIG. 12A is a schematic view showing the whole structure of the pressure sensor 100, and FIG. 12B is an exploded schematic view showing the assembly of each components forming the pressure sensor.

The present embodiment is characterized in that one or more notches 57' are formed on the shoulder portion 56 of the joint 50, and that one or more notches 97' are formed on the shoulder portion 96 of the connector case 90.

The assembly method of the present embodiment will now be explained. First, the sensor element 20 and the circuit board 30 are placed on the predetermined position in the interior space 14 of the housing 10. Next, the joint 50 is positioned so as not to provide strain to the lead 40, then the lead 40 is inserted to the penetrating hole of the penetrating condenser 60, placing the same to the second shoulder portion 18 of the housing 10. Then, the upper end of the rising portion 13 on the housing 10 is staked. At this time, a staking portion 19' is formed on the notch 57'.

Next, the opening of the terminal bottom end portion 73 of the terminal holder 70 is positioned and soldered to the end of the lead 40 penetrating through the penetrating condenser 60, and then the terminal 72 is inserted to the terminal penetrating hole formed on the connector case 90, positioning the connector case 90 on the separation wall 52 of the joint 50. Thereafter, the upper end of the rising portion 53 on the joint 50 is staked. At this time, a staking portion 59' is formed on the notch 97'.

The edge surface of the rising portion 13 and the rising portion 53 each run against the side surface of the notch 57' and the notch 97', preventing the rotation occurring between the housing 10 and the joint 50, or the joint 50 and the connector case 90.

The embodiments regarding the present invention was explained above. However, the unit-type penetrating condenser disclosed in the embodiments shown in FIG. 8 or FIG. 9 could be applied to the embodiment of FIG. 3 To such embodiment, the rotation preventing structure shown in the embodiments of FIG. 11 or FIG. 12 could also be applied.

Further, the rotation preventing structure regarding the embodiments of FIG. 11 or FIG. 12 could be applied to the embodiment of FIG. 3.

The unit-type penetrating condenser regarding the embodiments shown in FIG. 8 or FIG. 9 could be applied to the embodiment of FIG. 5. To such embodiment, the rotation preventing structure shown in the embodiments of FIG. 11 or FIG. 12 could also be applied.

Further, the rotation preventing structure regarding the embodiments shown in FIG. 11 or FIG. 12 could be applied to the embodiment of FIG. 5.

The unit-type penetrating condenser regarding the embodiments of FIG. 8 or FIG. 9 could be applied to the embodiment of FIG. 7. To such embodiment, the rotation preventing structure shown in the embodiments of FIG. 11 or FIG. 12 could also be applied.

Further, the rotation preventing structure regarding the embodiments of FIG. 11 or FIG. 12 could be applied to the embodiment of FIG. 7.

As was explained above, by staking the upper and lower portions by use of a joint having a separation wall, the present invention provides a pressure sensor where a container is formed by a housing, a joint and a connector case, and a sensor element, a penetrating condenser, a terminal, a terminal holder, a water-proof o-ring and the like are stored in the interior of said container, which could be assembled easily, and change of design of the connector case could be performed easily.

Even further, there is no need to mount a separate shield plate, which reduces the number of members needed to form the sensor, enabling easier assembling operation.

Further, a unit-type penetrating condenser is formed by gathering a plurality of penetrating condensers into one structure, which reduces the number of members needed to form the sensor, enabling easier assembling operation.

Even further, a rotation preventing structure is provided to the staking portion, which eliminates the possibility of rotation occurring to the staking portion. This is effective for preventing a defect from occurring to the electrical connection in the interior of the sensor, providing a long-lasting pressure sensor.

What is claimed is:

1. A pressure sensor comprising:
   a housing and a connector case, having in the interior thereof a sensor element for sensing pressure, a substrate having an amplifying thick-film board circuit, a lead for connecting the sensor element and a terminal, a shield plate with a penetrating condenser, a terminal holder and a terminal, and a water-proof o-ring; and
   a single piece joint having upper and lower staking portions wherein said housing and said connector case connect to the lower and upper staking portions, respectively.

2. The pressure sensor according to claim 1 wherein said shield plate is pinched between and fixed to the upper staking portion of said joint and said connector case.

3. The pressure sensor according to claim 1 or claim 2, wherein;
   said water-proof o-ring is mounted on said lower staking portion of said joint.

4. A pressure sensor comprising:
   a housing and a connector case, having in the interior thereof a sensor element for sensing pressure, a substrate having an amplifying thick-film board circuit, a lead for connecting the sensor element and a terminal, a penetrating condenser, a terminal holder and a terminal, and a water-proof o-ring; and a single piece joint having upper and lower staking portions wherein said housing and said connector case connected to the lower and upper portions, respectively, and said joint further includes a shield portion formed in a unit structure thereof for mounting said penetrating condenser.

5. The pressure sensor according to claim 1; wherein said housing comprises a liquid induction hole opened on a bottom portion of the interior space being connected to a pressure sensing space, and a circular protrusion formed on a peripheral of the opening of said pressure induction hole on said bottom portion;

said sensor element includes a pressure sensing element formed on a semiconductor substrate, an upper seat made of glass, a lower seat made of silicon, and a header made of metal which are piled up;

said joint includes an opening where a penetrating condenser is inserted; and the bottom surface of the header in said sensor element is mounted on said circular protrusion, the two members being airtightly welded together by an electrical resistance weld.

6. The pressure sensor according to claim 5; wherein a tube extended portion formed to fit to said liquid induction hole of the housing is mounted on the lower surface of the header of said sensor element.

7. The pressure sensor according to claims 5 or 6, wherein a plurality of said penetrating condensers are formed as one unit-type penetrating condenser.

8. The pressure sensor according to claims 5, 6 or 7, wherein a rotation preventing structure is formed on said staking portion.

9. The pressure sensor according to claim 8, wherein a protrusion is formed to each of a shoulder portion on the outer peripheral of said joint and a shoulder portion on the outer peripheral of said connector case, and the area excluding said protrusion is staked so as to form a remainder portion, thereby providing said rotation preventing structure.

10. The pressure sensor according to claim 4; wherein said housing includes a liquid induction hole opened on a bottom portion of the interior space being connected to the pressure sensing space, and a circular protrusion formed on a peripheral of the opening of said pressure induction hole on said bottom portion;

said sensor element includes a pressure sensing element formed on a semiconductor substrate, an upper seat made of glass, a lower seat made of silicon, and a header made of metal which are piled up;

said joint includes an opening where a penetrating condenser is to be inserted; and the bottom surface of the header in said sensor element is mounted on said circular protrusion, the two members being airtightly welded together by an electrical resistance weld.

11. The pressure sensor according to claim 10; wherein a tube extended portion formed to fit to said liquid induction hole of the housing is mounted on the lower surface of the header of said sensor element.

12. The pressure sensor according to claims 10 or 11; wherein a plurality of said penetrating condensers are formed as one unit-type penetrating condenser.

13. The pressure sensor according to claims 10 through 12; wherein a rotation preventing structure is formed on said staking portion.

14. The pressure sensor according to claim 13; wherein a protrusion is formed to each of a shoulder portion on the outer peripheral of said joint and a shoulder portion on the outer peripheral of said connector case, and the area excluding said protrusion is staked so as to form a remainder portion, thereby providing said rotation preventing structure.

* * * * *